June 19, 1962  J. J. KERLEY, JR  3,039,725

CABLE ISOLATED FLOOR AND MACHINE SUPPORT MOUNTS

Filed April 1, 1959

INVENTOR
James J. Kerley, Jr.

BY *Walter G. Finch*
ATTORNEY

United States Patent Office 3,039,725
Patented June 19, 1962

3,039,725
CABLE ISOLATED FLOOR AND MACHINE
SUPPORT MOUNTS
James J. Kerley, Jr., Cheverly, Md., assignor to Kerley Engineering, Inc., Cheverly, Md., a corporation of Maryland
Filed Apr. 1, 1959, Ser. No. 803,510
2 Claims. (Cl. 248—20)

This invention relates generally to vibration and shock type supports, and more particularly it pertains to shock and vibration floor mount systems. In addition, the principles and features of the invention can be applied to other types of arrangements, such as dollies, and movable truck arrangements, as will be pointed out subsequently.

It is often necessary to isolate noisy equipment from the floor upon which it rests. The use of isolators with heavy moving machinery reduces wear on the parts due to inertial load as well as eliminating annoyance from noise transmission to building structure.

The use of conventional rubber-type vibration isolators for footings is often unsatisfactory because of the deleterious effect of oil and chemicals found on the floors or decks of machine shops or factories. The failure of such isolators, especially on shipboard, would allow unrestrained movement of the machine with disastrous consequences.

It is a principal object of this invention to provide a vibration isolating mounting system of a cable type which will isolate the article from vibration and shock in three planes.

Another object of this invention is to provide a noise isolating mounting foot for machinery which is relatively unaffected by floor liquids.

Still another object is to provide a compact vibration isolating system which will not add greatly to the overall height.

Another object of the invention is to provide a pallet, skid, or castor mount for machines which has superior vibration and shock isolating qualities.

Other objects of this invention are to provide cable isolated floor and machine support mounts which are economical to manufacture, efficient and reliable in operational use, and which are compact and easy to install.

These and other objects and advantages of this invention will become more readily apparent and understood from the accompanying specification and drawings in which.

Figure 1:
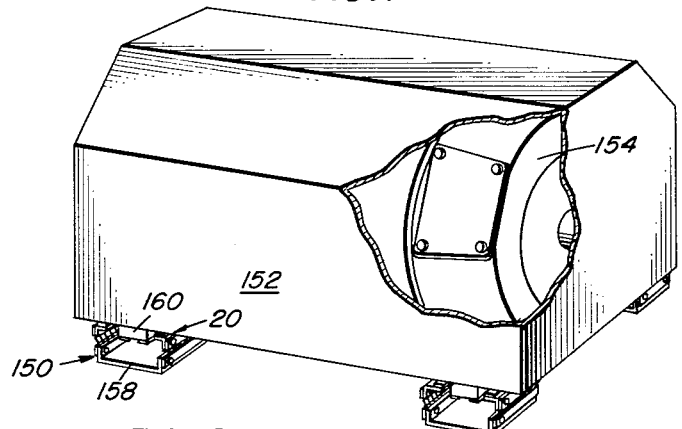
FIG. 1 is a perspective view of a mounted machine with its housing partly broken away.
Figure 2:
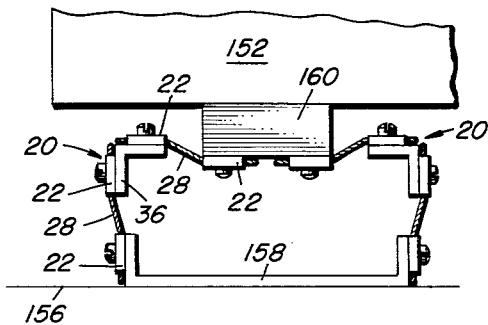
FIG. 2 is an enlarged end elevation of a mounting foot.
Figure 3:
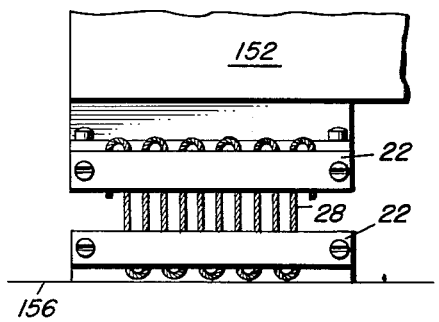
FIG. 3 is an enlarged side elevation of a mounting foot.

As shown in FIG. 1 of the drawings, a machine 154, such as a generator, electric motor, or the like, is provided with a noise proofing housing 152. An improved noise isolator foot 150, incorporating features of the invention, is then necessary to prevent conductive transmission of noise to a floor or deck 156, as further illustrated in FIGS. 2 and 3.

The improved noise isolator foot 150 is constructed of a plurality of shock and vibration isolator mounts 20 mounted serially in pairs between a bracket 160 secured to the housing 152 and a channel strip 158 which may be used for a skid or pallet or securing means to the floor or deck 156.

The members of each pair of shock and isolator mounts 20 are arranged at right angles to each other by a joining structural angle 36. Each shock and vibration isolator mount 20 is constructed of a pair of spaced combstrips 22 reeved and joined therethrough by a plurality of passes of a resilient multi-strand cable 28, as more specifically detailed in co-pending U.S. patent application of applicant filed jointly with Raymond G. Hartenstein, and Robert F. Cecce, Serial No. 744,787, on June 26, 1958, for "Vibration Isolator Mount."

Figure 4:
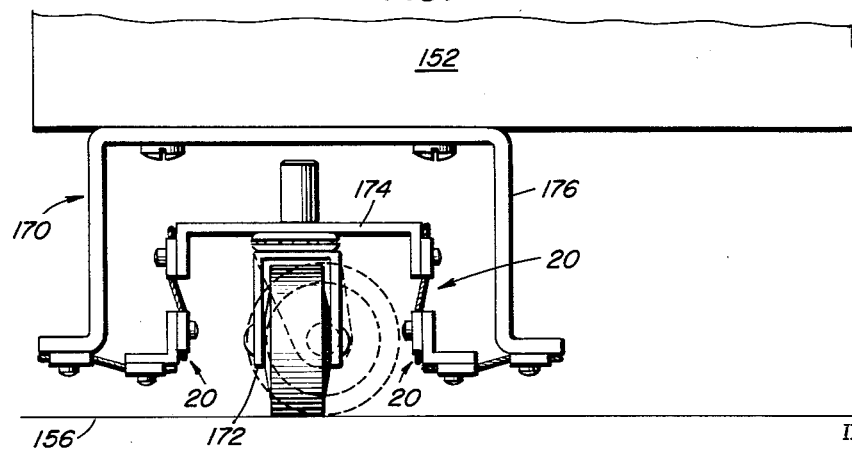
FIG. 4 shows a side elevation of a castor adaption of the mounting foot.

An inverted form or improved mounting or noise isolator wagon foot 170 is illustrated in FIG. 4. An inverted U-shaped housing bracket 176 is secured to and dependent from the housing 152. Within the space provided by this housing bracket 176, there is arranged a pivotal or fixed castor 172. A castor bracket 174 for supporting the castor 172 is joined to the housing bracket 176 through an intermediary isolation means consisting of the previously described shock and vibration isolator mounts 20 and right angle structural angles 36. Such arrangements of the castors 172 can be placed at various points beween the housing 152 and the supporting base so as to support the housing 152 as deserved. The same arrangement can be used to support a dolly or truck at three or more points of support for moving or rolling the dolly or truck.

In summary, it can be seen that the improved noise isolator foot 150 or the noise isolator wagon foot 170 occupy very little space over that required for conventional rigid pallet or skid feet or castor arrangements and yet have all the advantages of noise isolation in addition.

Obviously many other modifications and variations of the present invention are possible in light of the above teachings. It is, therefore, to be understood that within the scope of the appended claims the invention may be practiced otherwise than as specifically described.

What is claimed is:

1. A cable isolated vibration damper comprising means carrying a device to be isolated, spaced underlying support elements connected thereto for mounting the said means, a floor engageable base element beneath each support element, cable isolator assemblies supporting each support element from its adjacent base element comprising a pair of horizontally directed cable isolators attached to one of said elements and a pair of vertically directed cable isolators attached to the other of said elements and connected transversely with the horizontally directed isolators remotely of its attached element, the cable isolators each comprising a pair of spaced mounting bars connected by multiple passes of resilient cable, the bars embracing each cable pass at each end thereof.

2. The structure defined in claim 1 wherein each base element further comprises a floor engageable caster device.

References Cited in the file of this patent
UNITED STATES PATENTS

| | | |
|---|---|---|
| 2,275,846 | Durham | Mar. 10, 1942 |
| 2,294,674 | Lord | Sept. 1, 1942 |
| 2,873,109 | Hartenstein | Feb. 10, 1959 |